UNITED STATES PATENT OFFICE.

HEINRICH NERESHEIMER, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

ANTHRAQUINONE DYES AND PROCESS OF MAKING THEM.

1,207,982. Specification of Letters Patent. Patented Dec. 12, 1916.

No Drawing. Application filed October 29, 1914. Serial No. 869,167.

*To all whom it may concern:*

Be it known that I, HEINRICH NERESHEIMER, Ph. D., chemist, subject of the Queen of the Netherlands, residing at Ludwigshafen-on-the-Rhine, Germany, have invented new and useful Improvements in Anthraquinone Dyes and Processes of Making Them, of which the following is a specification.

I have discovered that by suitably treating 4-amino-3-sulfo-2.1-anthraquinone acridones of a constitution corresponding to the general formula:—

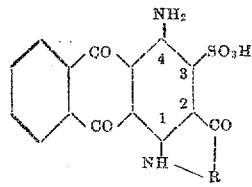

(where R represents an aromatic residue), including derivatives of these compounds, the sulfonic acid group in position 3 can very easily be split off, for instance, by means of heat, acid, alkali, or reducing agent. The production of 4-amino-3-sulfo-2.1-anthraquinone acridones can be effected by treating 4-amino-1-arylido-anthraquinone-3-sulfo-2'-carboxylic acids with suitable condensation agents as described in my co-pending application, Serial No. 869,166, of even date. In order to split off the sulfonic acid group from position 3, the compound may be heated in the presence of organic, or inorganic, agents, such, for instance, as nitrobenzene, trichlorbenzene, phenol, concentrated sulfuric acid, and weakly fuming sulfuric acid, or by treatment with cold, or warm, moderately diluted sulfuric acid, or with alkaline hydrosulfite solution. Sometimes the condensation to form the 4-amino-3-sulfo-2.1-anthraquinone acridone may be caused to take place under such conditions that the sulfonic acid group is immediately split off from the position 3, and intermediate separation of the sulfonic acid compound can be avoided. In some cases the sulfonic acid group can be split off in the dyeing bath, or even after the sulfonic acid has been applied to the fiber.

The amino-halogen-anthraquinone acridones of a constitution corresponding to the formula:—

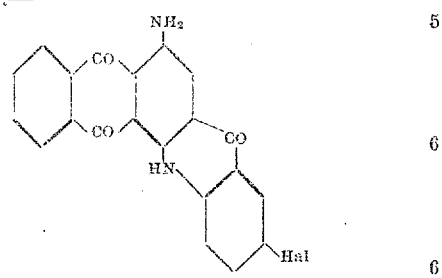

and which are obtainable by splitting off the sulfonic acid group from the products produced from 4-amino-1-para-halogen-ortho-carboxy-anilido-anthraquinone-3-sulfonic acid, by the action of 23% fuming sulfuric acid at from 20° to 25° C. have not hitherto been described in the literature. They consist when dry of dark blue powders which are insoluble in water, difficultly soluble in organic solvents of low boiling point, yield blue solutions in hot nitrobenzene, from brown to yellow solutions in concentrated sulfuric acid and with alkaline hydrosulfite give violet vats which dye cotton greenish blue to blue shades.

The following examples will serve to illustrate further the nature of this invention, which, however, is not confined to these examples. The parts are by weight:

Example 1: Dissolve ten parts of 4-amino-1-ortho-carboxy-anilido-anthraquinone-3-sulfonic acid in one hundred parts of chlorsulfonic acid, heat for half an hour at from 50° to 60° C., add some dilute sulfuric acid, pour onto ice, filter off the product and wash it well with a dilute solution of potassium chlorid. Then heat it with moderately dilute sulfuric acid, whereupon the sulfonic acid group in position 3 of the anthraquinone residue is split off and a pure wool dye is obtained which appears to be identical with that obtainable by sulfonating 4-amino-2.1-anthraquinone acridone.

Example 2: Boil one part of 4-amino-5'-chlor-2.1-anthraquinone-acridone-3-sulfonic acid (obtainable by treating 4-amino-1-para-chlor-ortho-carboxy-anilido-anthraquinone- 3-sulfonic acid with 23% fuming sulfuric acid at from 20° to 25° C.) with fifty parts of trichlorbenzene, or nitrobenzene, until by a test portion, it is seen that no unaltered sulfonic acid remains. Then allow the mass to cool, and filter off the 4-amino-5'-chlor-2.1-anthraquinone acridone, and wash it with alcohol. It is a dark blue powder, which is insoluble in water and is very difficultly soluble in organic solvents of low boiling point; it dissolves in boiling trichlor-benzene, anilin, and nitrobenzene, the solutions being blue and it yields a yellow-brown solution in concentrated sulfuric acid. It yields a violet vat with alkaline hydrosulfite and dyes cotton a clear and very fast greenish blue.

Example 3: Introduce ten parts of the potassium salt of 4-amino-1-anilido-anthraquinone-3-sulfo-2'-carboxylic acid (obtainable by condensing 4-amino-1-brom-anthraquinone-3-sulfo acid with potassium anthranilate) into one hundred parts of sulfuric acid monohydrate while at a temperature of from 120° to 125° C. Maintain the yellow-brown solution for a short time at this temperature, then cool, pour into water, filter off the sulfonic acid and wash with a dilute solution of potassium chlorid. During the reaction the acridone ring is formed, the sulfonic acid group is split off from position 3 and a sulfonic acid group enters the phenyl residue, since the product obtained appears to be identical with the sulfonation product of 4-amino-2.1-anthraquinone acridone. It yields a pure blue solution in water and in alcohol and a brown-yellow solution in concentrated sulfuric acid. It dyes wool, from an acid bath, fast blue shades.

Example 4: Introduce ten parts of the potassium salt of 4-amino-1-anilido-anthraquinone-3-sulfo-2'-carboxylic acid into a solution of seven parts of bromin in thirty-five parts of sulfuric acid monohydrate and thirty-five parts of chlor-sulfonic acid, while maintaining a temperature not above 15° C. Then stir for a few hours at from 10°, to 15° C., heat for one hour at from 40°, to 45° C. and then allow the product to flow slowly into two hundred parts of sixty-two per cent. sulfuric acid. Then allow the mixture to stand at ordinary temperature until the elimination of the sulfonic acid group is complete (this requires usually from twenty, to thirty hours), and pour the mass into water and work up as usual. The product is a brominated 4-amino-2.1-anthraquinone acridone, probably substituted in position 5' with bromin, and consists of a dark blue powder, which gives an orange solution in concentrated sulfuric acid. It dyes cotton from the vat pure blue shades.

Example 5: Digest together at the ordinary temperature two parts of 4-amino-5'-chlor-2.1-anthraquinone-acridone-3-sulfonic acid, one thousand parts of water, five parts of twenty-three per cent. caustic soda solution and four parts of sodium hydrosulfite. In this way a vat is obtained which can immediately be used for dyeing purposes. If necessary, Glauber's salt, or common salt, can be added. It dyes cotton greenish-blue shades which appear to be identical with those obtainable from the product of the foregoing Example 2.

Now what I claim is:—

1. The hereinbefore described anthraquinone dyes being amino-halogen-anthraquinone acridones probably possessing a constitution corresponding to the formula:—

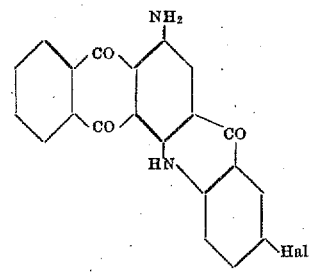

which consist when dry of dark blue powders containing halogen, are insoluble in water, difficultly soluble in organic solvents of low boiling point, give blue solutions in hot nitrobenzene, from brown to yellow solutions in concentrated sulfuric acid and which dissolve in alkaline hydrosulfite solution giving violet vats which dye cotton from greenish blue to pure blue.

2. The hereinbefore described anthraquinone dye being amino-chlor-anthraquinone acridone, probably possessing a constitution corresponding to the formula:—

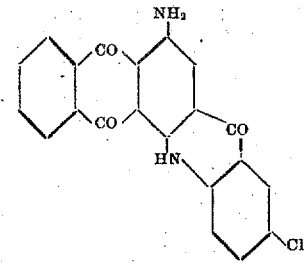

which consists when dry of a dark blue powder, containing chlorin, is insoluble in water, difficultly soluble in organic solvents of low boiling point, gives a blue solution in nitrobenzene, a yellow-brown solution in concentrated sulfuric acid, and which dissolves in alkaline hydrosulfite solution giving a violet vat, which dyes cotton greenish blue shades of excellent fastness.

3. The process of producing 4-amino-2.1-anthraquinone acridones by treating a 4-amino-3-sulfo-2.1-anthraquinone acridone so as to split off the sulfonic acid group from position 3.

4. The process of producing 4-amino-2.1 anthraquinone acridones by treating 4-amino-3-sulfo-2.1-anthraquinone acridones with an alkaline hydrosulfite solution.

5. The process of producing amino-halogen-anthraquinone acridones of a constitution corresponding to the formula:—

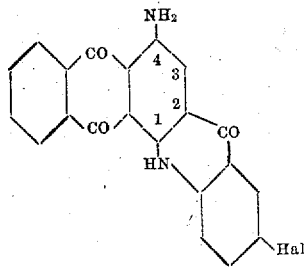

by treating the corresponding sulfonic acid compound containing the sulfonic acid group in position 3 with alkaline hydrosulfite solution.

6. The process of producing amino-chloranthraquinone acridone of a constitution corresponding to the formula:—

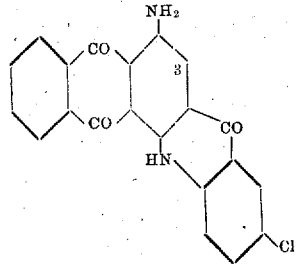

by treating the sulfonic acid derivative thereof containing the sulfonic acid group in position 3 with an alkaline hydrosulfite solution.

In testimony whereof I have hereunto set my hand in the presence of two subscribing witnesses

HEINRICH NERESHEIMER.

Witnesses:
H. MERLE COCHRAN,
W. ERNST.